United States Patent Office 2,833,727
Patented May 6, 1958

2,833,727

MANUFACTURE OF SOLID PHOSPHORIC ACID CATALYSTS

Julian M. Mavity, Hinsdale, and Mitchell S. Bielawski, Berwyn, Ill., assignors to Universal Oil Products Company, Des Plaines, Ill., a corporation of Delaware No Drawing. Application July 28, 1954
Serial No. 446,405

8 Claims. (Cl. 252—435)

This invention relates to the manufacture of solid catalysts which are useful in accelerating various reactions among organic compounds and particularly reactions involving unsaturated organic compounds. More particularly this invention relates to the preparation of a particular type of a solid phosphoric acid catalyst which is active in accelerating and directing olefin conversion reactions, particularly olefin polymerization reactions.

An object of this invention is to provide a method for preparing an improved solid phosphoric acid catalyst which is utilizable in promoting hydrocarbon conversion reactions.

A further object of this invention is to provide a solid phosphoric acid catalyst for use in the polymerization of olefinic hydrocarbons, said catalyst being provided with a high structural strength.

One embodiment of this invention resides in a process for the manufacture of a solid phosphoric acid catalyst which comprises reacting a phosphoric acid and a diatomaceous earth, subjecting mixture to an elevated pressure, extruding and calcining the mixture.

A specific embodiment of the invention is found in a process for manufacturing a solid phosphoric acid catalyst by mixing from about 15% to about 75% by weight of a phosphoric acid with about 85% to about 25% by weight of a siliceous adsorbent at a temperature in the range of from about 50° to about 500° F., subjecting the resulting mixture to an elevated pressure, extruding and calcining said mixture at a temperature in the range of from about 600° to about 1200° F.

A more specific embodiment of the invention resides in a process for the manufacture of a solid phosphoric acid catalyst which comprises mixing from about 15% to about 75% by weight of a polyphosphoric acid with about 85% to about 25% by weight of a siliceous adsorbent at a temperature in the range of from about 50° to about 500° F., subjecting the resulting mixture to a pressure of from about 5000 to about 50,000 p. s. i., extruding, and calcining the mixture at a temperature in the range of from about 600° to about 1200° F. for a period of time in the range of from about 1 to about 8 hours.

Other objects and embodiments of the invention will be found in the following further detailed description of the invention.

The essential and active ingredient of the solid catalysts which are manufactured by the process of this invention for use in organic reactions is an acid of phosphorus, preferably one in which the phosphorus has a valence of 5. The acid may constitute 15% to about 75% or more of the catalyst mixture ultimately produced and, in most cases, at least 50% by weight thereof of the various acids of phosphorus. Orthophosphoric acid ($H_3PO_4$) and pyrophosphoric acid ($H_4P_2O_7$) find general application in the primary mixtures, due mainly to the cheapness and to the readiness with which they may be procured, although the invention is not restricted to their use, but may employ any of the other acids of phosphorus insofar as they are adaptable. However, it is not intended to infer that the different acids of phosphorus which may be employed will produce catalysts which have identical effects upon any given organic reactions as each of the catalysts produced from different acids and by slightly varying procedures will exert its own characteristic action.

In using orthophosphoric acid as a primary ingredient, different concentrations of the aqueous solutions may be employed, for example, acid containing from approximately 75 to 100% $H_3PO_4$ or orthophosphoric acid containing some free phosphorus pentoxide may be used. By this is meant that the ortho acid may contain a definite percentage of the pyro acid corresponding to the primary phase of dehydration of orthophosphoric acid. Within these concentration ranges the acids will be liquids of varying viscosities and readily mixed with solid siliceous adsorbents.

In practice it has been found that pyrophosphoric acid corresponding to the formula: $H_4P_2O_7$ can be incorporated with solid siliceous adsorbents at temperatures somewhat above the melting point of the phosphoric acid and the period of heating which is given to the pyro acid-siliceous material or to the mixtures of other polyphosphoric acids and siliceous adsorbents may be different from that used when the ortho acid is so employed.

Triphosphoric acid which may be represented by the formula: $H_5P_3O_{10}$ may also be used as a starting material for preparation of the catalyst of this invention. These catalytic compositions may also be prepared from the siliceous materials and a phosphoric acid mixture containing orthophosphoric acid, pyrophosphoric acid, triphosphoric acid and other polyphosphoric acids.

A phosphoric acid mixture which is generally referred to as polyphosphoric acid may also be employed in this process. Polyphosphoric acid is formed by heating orthophosphoric acid or pyrophosphoric acid or mixtures thereof in suitable equipment such as carbon lined trays heated by flue gases or other suitable means to produce a phosphoric acid mixture generally analyzing from about 79 to about 85% by weight of $P_2O_5$. Such a liquid mixture of phosphoric acids with 79.4% $P_2O_5$ content was found by analysis to contain 24.5% of orthophosphoric acid ($H_3PO_4$), 45.2% of pyrophosphoric acid ($H_4P_2O_7$), 26.0% of triphosphoric acid ($H_5P_3O_{10}$), and 4.3% by weight of unidentified phosphoric acids. Another polyphosphoric acid mixture somewhat more concentrated than the one just referred to and having a $P_2O_5$ content of 84% by weight was found by analysis to contain about 57% by weight of triphosphoric acid ($H_5P_3O_{10}$), 17% by weight of hexametaphosphoric acid ($HPO_3)_6$, 11% by weight of pyrophosphoric acid ($H_4P_2O_7$), 5% by weight of orthophosphoric acid ($H_3PO_4$) and 10% by weight of unidentified phosphoric acids.

Another acid of phosphorus which may be employed in the manufacture of a composite catalyst according to the present invention is tetraphosphoric acid. It has the general formula: $H_6P_4O_{13}$ which corresponds to the double oxide formula: $3H_2O.2P_2O_5$ which in turn may be considered as the acid resulting when three molecules of water are lost by four molecules of orthophosphoric acid $H_3PO_4$. The tetraphosphoric acid may be manufactured by gradual or controlled dehydration or heating of orthophosphoric acid and pyrophosphoric acid or by adding phosphoric pentoxide to these acids in proper amounts. When the latter procedure is followed, phosphoric anhydride is added gradually until it amounts to 520% by weight of total water present. After a considerable period of standing at ordinary temperature the crystals of the tetraphosphoric acid separate from the viscous liquid and it is found that these crystals melt at approximately 93° F. and have a specific gravity of 1.1886 at a temperature of 60° F. However, it it unnecessary to crystallize the tetraphosphoric acid before employing it in the preparation of the solid catalyst inasmuch as the crude tetraphosphoric acid mixture may be incorporated with the solid siliceous adsorbent.

The materials which may be employed as adsorbents or carriers for oxygen acids of phosphorus are divided roughly into two classes. The first class comprises materials of predominantly siliceous character and includes diatomaceous earth, kieselguhr, and artificially prepared porous silica. The second class of materials which may be employed either alone or in conjunction with the first class comprises generally certain members of the class of aluminum silicates and includes such naturally occurring substances as various fuller's earths and clays such as bentonite, montmorillonite, acid treated clays and the like. Each adsorbent or supporting material which may be used will exert its own specific influence upon the net effectiveness of the catalyst composite which will not necessarily be identical with that of other members of the class.

The catalyst of the present invention may be prepared by mixing an acid of phosphorus such as orthophosphoric acid, pyrophosphoric acid, triphosphoric acid or tetraphosphoric acid and a diatomaceous earth such as kieselguhr or other siliceous adsorbent materials. The starting materials used in this catalyst preparation process are generally mixed at a temperature of from about 50 to about 500° F. to form an aggregate in which the phosphoric acid content is usually a major proportion by weight, although a temperature in the upper portion of a 200° to 500° F. range is often needed. The aggregate formed by the phosphoric acids and the siliceous adsorbent is a slightly moist to almost dry material which on being compressed becomes sufficiently plastic to permit extrusion and cutting operations to produce catalyst particles.

It has now been discovered that a problem which has plagued catalysts formed by prior art methods, that is, a breaking down of the crushing strength during the use of the catalyst, can be overcome by subjecting the catalyst so formed to compression before extruding the mixture. In the process of the present invention, the catalyst composites are subjected to a compression pressure in the range of from about 5000 p. s. i. to about 50,000 p. s. i., preferably at a pressure of from about 10,000 to about 25,000 p. s. i. before being subjected to extrusion. It has been found that by subjecting the catalyst composite to such elevated pressures, the crushing strength is rendered more stable and the catalyst does not break down as easily during use as do catalyst composites which were not subjected to such pressures before extrusion. The step of subjecting the catalysts to such compression may be carried out in either a batch-wise or continuous type of operation. The continuous type of operation is preferred since the size of the equipment in this process will be less than that required if a batchwise type of operation is used. For example, when a continuous type of operation is used, an auger or screw type fixture can be used to force the mixture from a hopper into a tube with a suitable, and preferably an automatic pressure control valve, at the discharge end of the tube. The time during which the composite is subjected to the aforesaid pressures will be comparatively short, and residence time during which the aggregate is under pressure ranging from about 15 minutes to about 60 minutes or less, the time depending upon particular catalysts undergoing preparation.

After being subjected to pressure, the catalyst is then extruded and subjected to calcination at temperatures ranging from about 600° to about 1200° F. for a period of time ranging from about 0.25 to about 10 hours to form a substantially solid granular catalytic material. The calcination of the formed particles of catalyst is usually carried out in a substantially inert gas such as air, nitrogen, flue gas and the like.

The resultant catalyst which has been calcined is active for promoting the polymerization of olefinic hydrocarbons, particularly for polymerizing normally gaseous olefinic hydrocarbons to form normally liquid hydrocarbons suitable for use as constituents of gasoline. When employed in the conversion of olefinic hydrocarbons into polymers, the calcined catalyst formed as hereinbefore set forth, is preferably employed as a granular layer in a heated reactor which is generally made from steel, and through which the preheated hydrocarbon fraction is directed. Thus, the solid catalyst of this process may be employed for treating mixtures of olefin-containing hydrocarbon vapors to effect olefin polymerization, but the same catalyst may also be used at operating conditions suitable for maintaining liquid phase operation during polymerization of olefinic hydrocarbons, such as butylenes, to produce gasoline fractions. When employed in the polymerization of normally gaseous olefins, the formed and calcined catalyst particles are generally placed in a vertical, cylindrical treating tower and the olefin-containing gas mixture is passed downwardly therethrough at a temperature of from about 350° to about 550° F. and at a pressure of from about 100 to about 1500 p. s. i. These conditions are particularly applicable when dealing with olefin-containing material such as stabilizer reflux which may contain from approximately 10 to 50% or more of propylene and butylenes. When operating on a mixture comprising essentially propylene and butylenes, this catalyst is effective at conditions favoring the maximum utilization of both normal butylenes and isobutylene which involves mixed polymerization at temperatures of from about 250° to about 325° F. and a pressure of from about 500 to about 1500 p. s. i.

The catalysts of this invention, when being used for promoting miscellaneous organic reactions, will be employed in essentially the same way as they are used when polymerizing olefins, in that the reactions are essentially in the vapor phase, and that they also may be employed in suspension in liquid phase in various types of equipment.

With suitable modifications in the details of operation, the present type of catalyst may be employed in a large number of organic reactions including polymerization of olefins as already mentioned. Typical cases of reactions in which the present type of catalyst may be used include the alkylation of cyclic compounds with olefins, the cyclic compounds including aromatics, polycyclic compounds, naphthenes and phenols; condensation reactions such as those occurring between ethers and aromatics, alcohols and aromatics, phenols and aldehydes, etc.; reactions involving the hydrohalogenation of unsaturated organic compounds, isomerization reactions; ester formation by the interaction of carboxylic acids and olefins; and the like. The specific procedures for utilizing the present type of catalyst in miscellaneous organic reactions will be determined by the chemical and physical characteristics and the phase of the reacting constituents.

During use of these catalysts in vapor phase polymerization and other vapor phase treatments of organic compounds, it is often of value to add small amounts of moisture to prevent excessive dehydration and subsequent decrease in catalyst activity and in order to substantially prevent loss of water from the catalyst. An amount of water or water vapor, such as steam is added to the charged olefinic containing gas so as to substantially balance the vapor pressure of the catalyst. This amount of water vapor varies from about 0.1 to about 6% by volume of the organic material charged.

The present invention is further illustrated with respect to specific embodiments thereof in the following example which, however, is not intended to limit the generally broad scope of the present invention in strict accordance therewith.

EXAMPLE I

A catalyst for the polymerization of olefinic hydrocarbons was prepared by mixing 166.8 g. of polyphosphoric acid (86.1% $P_2O_5$) and 81.81 g. of a diatomaceous earth known in the trade as Dicalite. The mixing was accomplished by stirring Dicalite into said acid which had been previously heated to 340° F. The resulting powdery composite was loaded into a 3/16" die of an extrusion assembly of a hydraulic press and subjected to a pressure of 10,000 lbs. per square inch until the extrudate just started to appear. The orifice of the extrusion assembly was then blocked with a steel block and the composite in the die was subjected to a 16,000 lb. per square inch compression. The steel block was removed and an application of 10,000 lb. per square inch initiated the extrusion while a 6000 lb. per square inch was needed to maintain said extrusion. The extrudate was then cut into 3/16" long pills. The pills were heated for 1 hour at 340° F. and subjected to calcinations at 680° and 860° F. for a period of time ranging from about 1 hour to about 4 hours.

The catalysts prepared in the above manner, hereinafter designated as A, B, and C were used in a test to determine the crushing strength before and after being used to polymerize olefinic hydrocarbons. 10 g. of the catalyst pills were placed in a 850 cc. rotating bomb and subjected to the action of 100 g. of an approximately 50–50 mol percent propane-propylene feed for 2 hours at an average temperature of 232° C. The results of this test appear in Table I below.

Table I

| Catalyst | Calcination | | Percent $C_3H_6$ Conversion | Crushing Strength, lbs. | |
|---|---|---|---|---|---|
| | Temp., °F. | Time, Hours | | Before Test | After Test |
| A | 680 | 1 | 39.5 | 26.0 | 26.3 |
| B | 860 | 1 | 43.0 | 25.0 | 25.7 |
| C | 860 | 4 | 51.1 | 22.7 | 26.0 |

We claim as our invention:

1. A process for the manufacture of a solid phosphoric acid catalyst which comprises mixing a phosphoric acid and a siliceous adsorbent, subjecting the resulting mixture to compression at a pressure of from about 5000 to about 50,000 pounds per square inch, and thereafter extruding, drying and calcining said mixture.

2. A process for the manufacture of a solid phosphoric acid catalyst which comprises mixing a phosphoric acid and a diatomaceous earth, subjecting the resulting mixture to compression at a pressure of from about 5000 to about 50,000 pounds per square inch, and thereafter extruding, drying and calcining said mixture.

3. A process for the manufacture of a solid phosphoric acid catalyst which comprises mixing from about 15% to about 75% by weight of a phosphoric acid with about 85% to 25% by weight of a siliceous adsorbent, subjecting the resulting mixture to compression at a pressure of from about 5000 to about 50,000 pounds per square inch, and thereafter extruding, drying and calcining said mixture.

4. A process for the manufacture of a solid phosphoric acid catalyst which comprises mixing from about 15% to about 75% by weight of a phosphoric acid with about 85% to about 25% by weight of siliceous adsorbent at a temperature of from about 50° to about 500° F., subjecting said mixture to compression at a pressure of from about 5000 to about 50,000 pounds per square inch, thereafter extruding said mixture and then calcining at a temperature in the range of from about 600° to about 1200° F.

5. A process for the manufacture of a solid phosphoric acid catalyst which comprises mixing from about 15% to about 75% by weight of a phosphoric acid with about 85% to about 25% by weight of a siliceous adsorbent at a temperature in the range of from about 50° to about 500° F., subjecting said mixture to compression at a pressure of from about 5000 to about 50,000 pounds per square inch, thereafter extruding the mixture, drying the extruded mixture at a temperature in the range of from about 200° to about 400° F. and then calcining at a temperature in the range of from about 600° to about 1200° F.

6. A process for the manufacture of a solid phosphoric acid catalyst which comprises mixing from about 15% to about 75% by weight of a polyphosphoric acid with about 85% to about 25% by weight of a siliceous adsorbent at a temperature in the range of from about 50° to about 500° F., subjecting said mixture to compression at a pressure of from about 5000 to about 50,000 pounds per square inch, thereafter extruding the mixture, drying the extruded mixture at a temperature in the range of from about 200° to about 400° F., and then calcining said mixture at a temperature in the range of from about 600° to about 1200° F. for a period of time in the range of from about 1 to about 8 hours.

7. In a process for the manufacture of a solid phosphoric acid catalyst which comprises mixing from about 15% to about 75% by weight of a polyphosphoric acid with about 85% to about 25% by weight of a siliceous adsorbent at a temperature in the range of from about 50° to about 500° F., extruding, drying the resultant mixture at a temperature in the range of from about 200° to about 350° F., and calcining the mixture at a temperature in the range of from about 600° to about 1200° F. for a period of time in the range of from about 1 to about 8 hours, the improvement which comprises subjecting said mixture to a pressure of from about 5000 to about 50,000 p. s. i. before extrusion.

8. In a process for the manufacture of a solid phosphoric acid catalyst which comprises mixing from about 15% to about 75% by weight of a polyphosphoric acid with about 85% to about 25% by weight of a siliceous adsorbent at a temperature in the range of from about 50° to about 500° F., extruding, drying the resultant mixture at a temperature in the range of from about 200° to about 350° F., and calcining the mixture at a temperature in the range of from about 600° to about 1200° F. for a period of time in the range of from about 1 to about 8 hours, the improvement which comprises subjecting said mixture to a pressure of from about 10,000 to 25,000 p. s. i. before extrusion.

References Cited in the file of this patent

UNITED STATES PATENTS 2,120,723 Watson _____ June 14, 1938
2,694,048 Bielawski _____ Nov. 9, 1954